Sept. 9, 1969 J. R. MOSER ET AL 3,466,602

SINGLE ERROR DETECTOR FOR BINARY INFORMATION

Filed May 18, 1966 2 Sheets-Sheet 1

INVENTORS
JOSEPH R. MOSER
ODO J. STRUGER

BY Thomas E. Schatzel

INVENTORS
JOSEPH R. MOSER
ODO J. STRUGER
BY Thomas E. Schatzel

United States Patent Office 3,466,602 Patented Sept. 9, 1969

3,466,602
SINGLE ERROR DETECTOR FOR BINARY INFORMATION

Joseph R. Moser, Brookfield, and Odo J. Struger, Milwaukee, Wis., assignors to Allen-Bradley Company, Milwaukee, Wis., a corporation of Wisconsin
Filed May 18, 1966, Ser. No. 551,101
Int. Cl. G06f 11/00, 11/08
U.S. Cl. 340—146.1 5 Claims

ABSTRACT OF THE DISCLOSURE

The present invention pertains to data transfer circuitry and to a network for detecting signals in binary coded information formats. More specifically, the invention pertains to a single error detector adapted to simultaneously receive a group of pulse signals of two levels and which detector compares the sum of the pulses within the group to determine if the sum of the signals of either level is odd or even. The detector is further adapted to receive in succession a plurality of the groups and compare the sum of the pulses within each group to determine if the sum of the signals of either level of each group is odd or even.

The present invention has wide use as a parity check circuit in numerical machine tool control systems. A numerical control system, as is well known, may be viewed as a system adapted for automatic control of the operation of devices movable in one or more planes according to a preselected plan, as for instance, in the case of machine tool applications. The information necessary to accomplish the plan is programmed on cards or a tape according to a binary code of One and Zero bits. Numerical control tapes are commonly divided into traverse lines or rows with each line containing a specific character of information wtih the One bits represented by holes in the tape and Zero bits represented by the absence of a hole. The tape passes through the tape reader which relays the coded information in the form of electrical pulse signals to other networks of the system. Frequently, the reading is accomplished by the generation of a pulse signal (a signal of level one) only when a hole is detected and no signal (a signal of zero level) when no hole is detected. In turn, machine tool elements will respond according to the instructions of the electrical pulse signals.

Parity checking enhances the ability of error detection in binary-code processed information. Such checking establishes a computer standard wherein either an odd or even number of One bits (one-level signals) may be included in each line of the record. One channel or column of each line of a punched tape or card may be reserved for partity checking, such that once the standard is determined, for example, odd, a parity bit is added in the parity channel of each line having an even number of One bits to satisfy the standard. If the line has an odd number of One bits, no parity bit is added. By detecting the sum of the One bits of each line, the computer can, in turn, determine if a One bit has been erroneously added or lost—if the sum is even an error has occurred. The error may be the result of an erroneous hole appearing in the line, e.g. due to excessive wear, or the blocking of a properly punched hole, e.g. due to foreign particles.

Assuming that an "odd" standard is established, the detector of the present invention is designed to provide an error indication when the One-bit sum is even. The error indication may be utilized to excite an error indicator, for example, a buzzer or a light and a relay which shuts down the numerical control system indicating that the cause of shut-down is due to a non-parity. The detector comprises an arrangement of a plurality of "Exclusive-Or" logic elements receiving generated electrical indications from a reading means corresponding to the presence of One and Zero bits of the information format. Each "Exclusive-Or" element has a plurality of input terminals and a single output terminal across which an electrical output indication is generated when an input signal is applied to one and only one of the input terminals. Considering an "Exclusive-Or" element with two input terminals, no output indication is generated when both input terminals receive pulses or when neither receive pulses. The "Exclusive-Or" logic elements may include combinations of electromagnetic relays, transistors, diodes, transformers or various other components. A first group of "Exclusive-Or" logic elements may each receive indications from at least two channels of each line and, in turn, generate an indication when an odd number of One bits is received at the input. For example, assuming that (1) the tape comprises the standard eight channels; and (2) each "Exclusive-Or" element has two input terminals, then four "Exclusive-Or" logic elements comprise the first group with each element receiving pulses according to two channels of each line. Each element generates an indication when there is a single One bit pulse received at the associated input terminals. Cascaded to the first group is a second group of "Exclusive-Or" logic elements with each second group element responsive to the generated indications of a plurality of the first group elements. For example, if each second group element responds to the indications of two first group members, there will be two "Exclusive-Or" logic elements in the second group each individually cascaded to two logic elements of the first group. Each second group element may, in turn, generate an indication when the indications received from the first group is odd. The detector network may comprise a further "Exclusive-Or" logic element group cascaded to the second group with the third group responsive to the signals generated by the second group elements. Again, assuming that the third group elements each respond to two signals, in the example a single logic element will consist of the third group and receive both output terminals of the two second group elements. The third group logic elements generate an output indication according to the exclusiveness of a single signal at its input. Accordingly, if an odd number of One bits is applied to any first group element, signals will be generated and received by the second group elements. If the number of electrical indication to any or each of the second group elements is odd, an output signal is generated and delivered to the third group logic elements. If the signals to the third group is odd, an output indication will be generated by the third group elements.

There is a constant demand for faster operating numerical controls. Accordingly, it is necessary that the binary coded record be more rapidly advanced and accurately read to meet the demand. Networks have been designed for more rapid reading and storing of the programmed information. Mechanical drivers have been designed such that the tapes may be advanced more rapidly. Thus, it is necessary that parity checking be accomplished at a rate consistent with other control operations. The present circuit, when utilized as a parity check circuit, may incorporate "Exclusive-Or" logic elements comprised of solid-state components such as diodes and transistors, thereby providing an economical circuit that is very rapid as compared to those circuits heretofore available. In the numerical control industry, it is common to have tape reader circuits which advance the tape at the rate of sixty or one-hundred lines per second. The present circuit may be designed to accommodate such speeds and speeds excessive to those presently being utilized.

The present invention further discloses an auxiliary circuit which may be incorporated with the present error detector to indicate when an error is present and also to disconnect the power to the control. When utilized as a parity check circuit and an error is detected, the control is deenergized and an indicator which may be in the form of a light, buzzer, etc. is excited. The operator is then informed that a parity error caused shutdown. The tape may then be replaced or corrected and the system re-energized.

The foregoing and other features and advantages of this invention will appear in the description to follow. In the description reference is made to the accompanying drawings which show by way of illustration and not of limitation one embodiment of the present invention.

Figure 2:
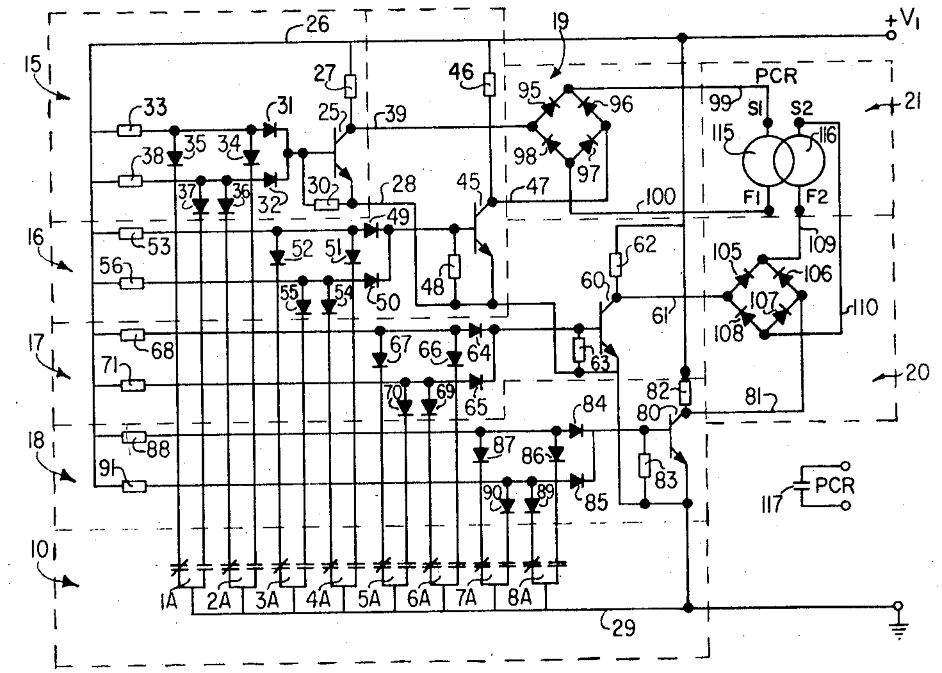
FIG. 2 illustrates a circuit diagram according to the block diagram of FIG. 1 incorporating solid-state components and an electromagnetic relay for rapid checking of a binary coded information record.
Figure 3:
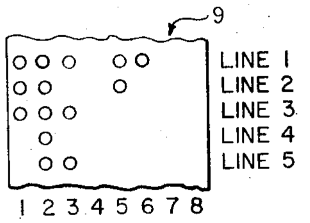

FIG. 3 illustrates a segment of a BCD information record in the form of a tape having eight channels. The segment illustrates five transverse lines of information with four lines having an odd number of holes coinciding with odd parity. The fifth line carries an even number of holes so that a parity error is present and is illustrated to demonstrate the response of the detector of FIG. 2 when parity error occurs.

Figure 4:
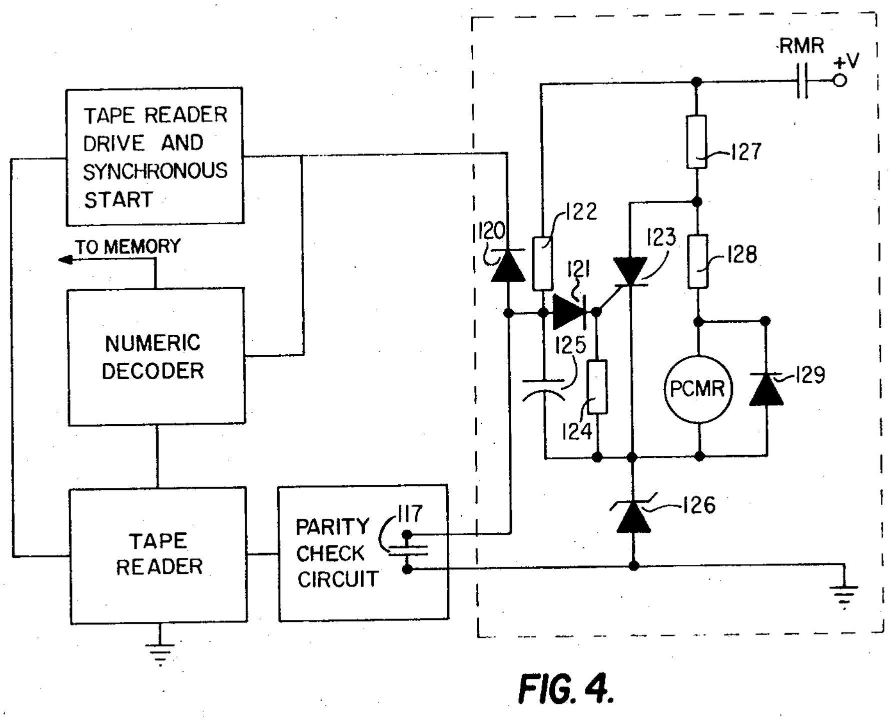

FIG. 4 illustrates an auxiliary circuit designed to accommodate the parity check circuit of FIG. 2. The diagram further illustrates the association of the parity check circuit with other networks of a numerical control system.

Figure 5:
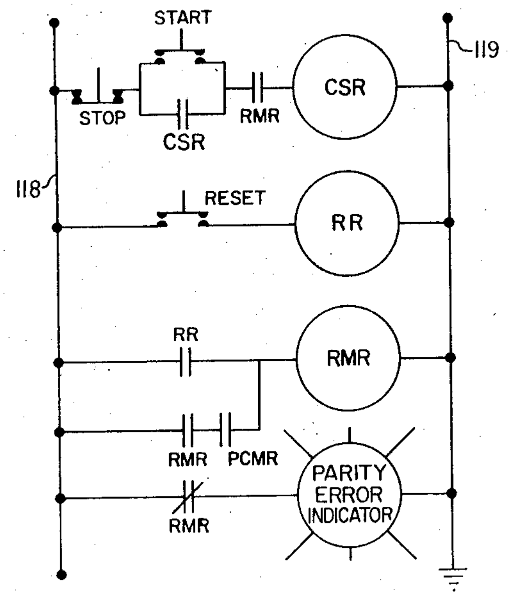

FIG. 5 illustrates an arrangement of electromagnetic relays and push-button switches designed to accommodate the circuit of FIG. 4 for indicating when a parity error is sensed and for energizing and de-energizing the numerical control system of FIG. 4.

Referring specifically to the drawings, FIG. 3 illustrates a BCD information record having a set of eight channels 1–8, said record being in the form of a segment of a perforated tape referred to by the general reference character 9. The circles or perforations in the tape 9 illustrates a One bit (one level pulse signal) and the absence of a circle indicates a Zero bit (zero level pulse signal). Channel 5 of the tape 9 indicates when a parity bit is included to accompany an odd parity standard. On the tape segment 9, there are five traverse lines designated Lines 1–5, respectively. In numerical control systems, tape 9 is advanced past a tape reader which includes reading means detecting the presence and absence of One bits in each line. In the present diagrams, the tape reader is not illustrated in full but a switching network in the form of a plurality of C-type contacts 1A–8A within the broken-line diagram 10 of FIG. 2 illustrates a conventional punched tape or card reading means. Each of the C-contacts 1A through 8A, respectively, corresponds to a specific channel of the tape 9 and includes a normally-open (NO) contact and a normally-closed (NC) contact. Each C-contact assumes a first contact relationship when a One bit is present and another contact relationship when a Zero bit is present. The contacts of each C-contact 1A–8A remain in their normal position when the bit of the associated channel is a Zero and alter their position with the NC contact opening and the NO contact closing when the bit is a One. For example, viewing channel 1, if a One bit is present, the NC contact of the C-contact—1A will be opened and the NO contact closed.

Figure 1:
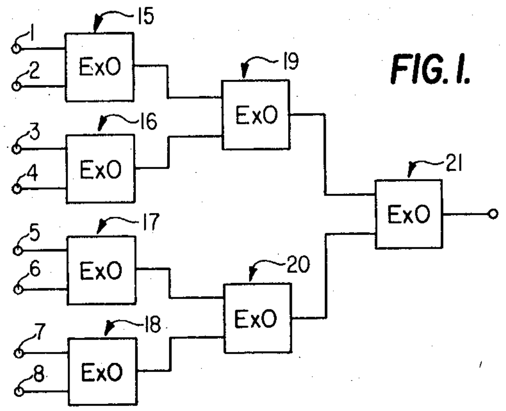
FIG. 1 illustrates in block diagram form the arrangement of the "Exclusive-Or" logic elements cascaded in and arranged for parity checking a binary coded decimal (BCD) information tape having eight channels.

FIG. 1 illustrates the plurality of "Exclusive-Or" logic elements with each being designated ExO. The ExO elements are divided into groups with the first group including a set of ExO elements 15, 16, 17 and 18 and cascaded to a second group including a pair of ExO elements 19 and 20 in turn cascaded to a third group including a single ExO element 21. The ExO element 15 receives the Zero and One bits of channels 1 and 2; the ExO element 16 receives the bits of channels 3 and 4; the ExO elements 17 receives the bits of channels 5 and 6 and the ExO element 18 receives the bits of channels 7 and 8. The ExO element 19 responds according to indications of the ExO elements 15 and 16 while the ExO element 20 responds according to indications of the ExO elements 17 and 18. The ExO element 21 serves as a responding means responsive to the indications of the ExO elements 19 and 20. If there are an odd number of One bits to the input terminals of any one or combination of the ExO elements 15, 16, 17 and 18 the respective logic element generates an indication to the associated ExO element 19 or 20. If the number of indications to the ExO element 19 are odd, then it in turn generates an indication to the ExO element 21. At the same time, if the number of indications to the ExO element 20 is odd, it generates an indication to the ExO element 21. When the output indications of the ExO elements 19 and 20 are odd, the ExO element 21 generates a responsive output signal. Accordingly, the diagram of FIG. 1 illustrates that when the sum of input One bits is odd, an output signal is produced.

In FIG. 2 a solid-state circuit diagram according to the block diagram of FIG. 1 is illustrated. For clarity purposes, the ExO elements 15–21, inclusive, are shown within broken-line block diagrams carrying the same reference numerals. It may be noted that the ExO elements 15–18, inclusive, each comprise solid-state components including a current gate in the form of an NPN transistor and associated undirectional conducting components in the form of diodes. The ExO element 15 includes an NPN transistor 25 with the collector electrode extending to a common positive potential line 26 through resistive component 27. The line 26 terminates at a terminal designated $+V_1$ for receiving a positive auxiliary source—normally 24 volts. The emitter electrode of the transistor 25 is connected to a common line 28 which extends to a common ground line 29. The line 29 terminates at a ground terminal for receiving the other side of the auxiliary source. Intermediate the control element or base of the transistor 25 and the emitter of the transistor 25 is a resistive components 30 which shunts leakage current to the line 28 to insure temperature stability of the transistor operation. Also joining the base of the transistor 25 are the cathodes of a pair of diodes 31 and 32. The anode of the diode 31 is common to the anode of a diode 34, the anode of the diode 35 and a bias resistive component 33. The other side of the bias component 33 is tied to the + potential line 26. The cathode of the diode 34 is common to the NO contact of the C-contact 2A of the tape reader 10. The cathode of the diode 35 is common to the NC contact of the C-contact 1A. Connected to the anode of the diode 32 are one side of a bias resistive component 38, and the anodes of the diodes 36 and 37. The other side of the bias component 38 is common to the potential line 26. The cathode of the diode 36 is common to the NC contact of the C-contact 2A and the cathode of the diode 37 is common to the NO contact of the C-contact 1A. The collector of the transistor 25 also joins a lead line 39 which is connected at its opposite end to the ExO element 19. The line 39 may be considered as an input line to the ExO element 19.

The ExO element 16 is designed similar to the ExO element 15. The element 16 consists of an NPN transistor 45 with the collector joining a resistive component 46 and a lead line 47. The line 47 may be considered as another input line to the ExO element 19. The other side of the component 46 joins the potential line 26. The emitter of the transistor 45 is common to the line 28. Extending between the base and the emitter of the transistor 45 is a resistive component 48. Also joining the base of the transistor 45 are the cathodes of a pair of diodes 49 and 50. The anode of the diode 49 is common to the anode of a diode 51, the anode of a diode 52 and a bias resistive component 53. The other side of the component 53 joins the potential line 26. The cathode of the diode 51 is common to the contact of the C-contact 4A and the cathode of the diode 52 is common to the NC contact of the C-contact 3A. The anode of the diode 50 joins the anode of a diode 54, the anode of a diode 55 and one side of a bias resistive component 56. The other side of the component 56 is common to the potential line 26. The cathode of the diode 54 is common to the NC contact of the C-contact 4A and the cathode of the diode 55 is common to the NO contact of the C-contact 3A.

The ExO element 17 includes an NPN transistor 60 with its collector common to a lead line 61 and one side of a resistive component 62. The line 61 may be considered as an input line to the ExO element 20. The other side of the component 62 is common to the potential line 26. The emitter of the transistor 60 is common to the line 28. Extending across the base and the emitter of the transistor 60 is a resistive component 63. The base of the transistor 60 is also common to the cathode of a pair of diodes 64 and 65. The anode of the diode 64 is common to the anode of a diode 66, the anode of a diode 67 and one side of a bias resistive component 68. The other side of the component 68 is connected to the potential line 26. The cathode of the diode 66 joins the NO contact of the C-contact 6A and the cathode of the diode 67 joins the NC contact of the C-contact 5A. The anode of the diode 65 is common to the respective anodes of the diodes 69 and 70 and to one side of a bias resistive component 71. The other side of the component 71 is connected to the potential line 26. The cathode of the diode 69 is common to the NC contact of the C-contact 6A and the cathode of the diode 70 is common to the NO contact of the C-contact 5A.

The ExO element 18 comprises an NPN transistor 80 with its collector common to a lead line 81 and one side of a resistive component 82. The lead 81 may be considered as the other input lead to the ExO element 20. The other side of the component 82 is common to the potential line 26. The emitter of the transistor 80 is common to the line 28. Extending between the base and the emitter of the transistor 80 is a resistive component 83. Also joining the base of the transistor 80 are the cathodes of a pair of diodes 84 and 85. The anode of the diode 84 is common to the anode of a diode 86, the anode of a diode 87 and one side of a bias resistive component 88. The other side of the component 88 joins the potential line 26. The cathode of the diode 86 joins the NO contact of the C-contact 8A and the cathode of the diode 87 joins the NC contact of the C-contact 7A. Joining the anode of the diode 85 are the anode of a diode 89, the anode of a diode 90 and one side of a bias resistive component 91. The other side of the component 91 joins the potential line 26. The cathode of the diode 89 is common to the NC contact of the C-contact 8A and the cathode of the diode 90 is common to the NO contact of the C-contact 7A.

The ExO elements 19 and 20 comprise full-wave bridge rectifiers, each including solid state unidirectional conducting devices in the form of interconnected diodes 95, 96, 97 and 98. The anode of the diode 95 and the cathode of the diode 98 join the input line 39 from the ExO element 15. The anode of the diode 96 and the cathode of the diode 97 join the input line 47 of ExO element 16. The output indication of the ExO element 19 appears across a pair of lead lines 99 and 100. The line 99 is common to the cathode of the diode 95 and 96. The line 100 is common to the anodes of the diodes 97 and 98.

The ExO element 20 includes a full wave rectifier comprising diodes 105, 106, 107 and 108. The anode of the diode 105 and the cathode of the diode 108 join the input line 61 from ExO element 17, whereas the anode of the diode 106 and the cathode of the diode 107 join the input line 81 of the ExO element 18. The output indication of the ExO element 20 appears across a pair of lines 109 and 110, with the line 109 being common to the cathodes of the diodes 105 and 106. The line 110 is common to the anodes of the diodes 107 and 108.

The responding means of the ExO element 21, which in this embodiment comprises the third group Exclusive-OR logic elements, includes an electromagnetic relay PCR comprising a pair of coils 115 and 116 and an NO contact 117. The coil 115 joins the output lines 99 and 100 from the ExO element 19, whereas the coil 116 joins the output lines 109 and 110 of the ExO element 20. The coils 115 and 116 are connected such that the electromagnetic fields which they generate by current flow oppose each other. The direction of current flow through the coil 115 is from $S_1$ to $F_1$ while in the coil 116 from $F_2$ to $S_2$. Therefore, when current is flowing through both or neither of the coils 115 and 116, the net field is substantially zero and the contact 117 remains in the NO position. When only one coil 115 or 116 carries current the NO contact 117 will close.

The theoretical operation of the circuitry of FIG. 2 is believed to be as hereinafter set forth. As shown, the type C-contacts 1A–8A, inclusive, are in a normal position when a Zero bit appears on the associated channel of the tape 9. For example, when a Zero bit appears in channel 1, the NC and NO contacts of 1A remain in their normal positions and when a One bit appears, the contacts are reversed such that the NC contact assumes an open position and the NO contact assumes a closed position. It may be noted that the error indicator or parity check network of this invention provides for live switching when contacts such as the C-contacts 1A–8A are utilized in the reading means 10.

The theoretical discussion of the ExO elements 15–18 will be primarily centered about the element 15. The ExO elements 15–18, inclusive, are similar and the theory is applicable to each. First it may be noted that a unidirectional path exists between the positive potential line 26 and the ground line 29 through the bias resistive component 33, the diode 31, the base-emitter junction of transistor 25 and the line 28. A second unidirectional path, parallel to the above path extends through the bias resistor 38, the diode 32 and the base-emitter junction of the transistor 25. The pulses from the reading means 10 drive the ExO element 15 by determining when neither, either or both of the paths are bypassed through the C-contacts 1A and/or 2A. According to the code punched in Line 1 of tape segment 9, channels 1 and 2 each have a One bit. The NC contact of the C-contact assumes an open position and the NO contact assumes a closed position responsive to this information. At the same time, the NO contact of 2A closes and the NC contact opens. Accordingly, the path of the high potential line 26 through the bias resistive component 33, the diode 35 to the ground line 29 is open, but the path through the diode 34 to ground is closed. At the same time, the path from the potential line 26 through the bias resistive component 38 and diode 37 is closed due to the closing of the NO contact of the C-contact 1A while the path through the diode 36 to the ground 29 is open. Thus, since both bias resistors 33 and 38 are tied to the ground line 29, the transistor 25 is in a non-conductive state. During the non-conductive state of the transistor 25, the lead line 39, which serves as one input to the ExO element 19, remains at approximately $V_1$ potential.

Further considering line 1 of tape segment 9, it will be noted that a One bit appears in channel 3 and a Zero bit in channel 4. Accordingly, the contacts of the C-contact 3A reverse their normal position and the contacts of the C-contact 4A remain in their normal position. As such, there is an open path between the line 26 through the resistive component 53 and the diode 52 to the ground line 29. Also, the path between the lines 26 and 29 through the diode 51 is open. At the same time, there is a closed path between the lines 26 and 29 through the bias resistor 56 and the diode 55 due to the now closed NO contact of the C-contact 3A. However, the diode 50 prevents the transistor 45 from seeing the closed path and consequently the transistor 45 is in a conductive state placing the lead line 47 at substantially ground potential. Therefore, due to the coding of line 1, there is exclusiveness in the ExO element 16 and non-exclusiveness in the ExO element 15 and consequently there is exclusiveness to the input of the ExO element 19.

Viewing the line 1 of the tape segment 9 further, the parity channel 5 has a One bit and channel 6 a One bit. Thus, the transistor 60 is not in a conductive state and the lead line 61 is substantially the $V_1$ potential. The ExO element 18, which accommodates channels 7 and 8, has two Zero bits such that the transistor 80 is in a non-conductive state and the lead line 81 remains at substantially $V_1$ potential.

The ExO elements 19 and 20 as illustrated are full-wave bridge rectifiers with a direction of current through the bridges dependent upon the polarity of the potential difference across their respective input lines. For example, still considering line 1 of the tape segment 9, the difference in potential between the lines 39 and 40 results in current flow through the ExO element 19. The direction is through the diode 95, the line 99, the coil 115, the line 100, the diode 97 to the line 47. A field is generated by the current flow of the coil 115. At the same time, both lines 61 and 81 are at substantially $V_1$ potential so that the diode bridge of the ExO element 20 does not conduct. No field is generated in the coil 116. Accordingly, there is a net flux difference between the coils 115 and 116 and the NO contact 117 closes assuming a conductive state indicative that there are an odd number of One bits in the line 1.

The lines 2, 3 and 4 of the tape 9 also carry an odd number of One bits. However, for illustrative purposes, the line 5 is shown with an even number of One bits so as not to conform to the odd parity standard. Thus, an error signal should be generated to indicate the parity error. In line 5 there are One bits, channels 2 and 3. Thus, the ExO elements 15 and 16 each generate an output indication, i.e. the transistors 25 and 45 are each in a conductive state placing the lead lines 39 and 47 both at substantially ground potential. At the same time, the ExO elements 17 and 18 have Zero bits and the transistors 60 and 80 are in non-conductive states leaving the lead lines 61 and 81 both at a potential above ground potential. Neither ExO elements 19 or 20 conduct since there is no difference in potential between their respective input lead lines. Accordingly, no current flows through the coils 115 or 116 and the NO contact 117 remains open contrasted to the closed condition when an odd number of One bits is present. It will be obvious to those skilled in the art that if the parity standard is established to be even, rather than odd, exactly the same circuitry may be incorporated except that the contacts of the relay PCR are biased in a normally-closed condition. The combination of the ExO element 21 and the contacts 117 provides an Exclusive-Or means responsive to the generated signals of the ExO elements 19 and 20. The contacts 117 assume one state when either the element 19 or 20 conducts and another state when both or neither of the elements 19 or 20 conduct. As will be hereinafter described, the relationship of the contacts 117 is utilized to operate an indicator showing the absence of or presence of a parity error.

FIG. 4 indicates the association of the NO contact 117 and the detector described in FIGS. 1 and 2 with an auxiliary check circuit. Also, to illustrate the association of the detector (Parity Check Circuit) in a numerical control system, a Tape Reader, a Numeric Decoder, and a Tape Reader Drive and Start network is also illustrated. The output from the Numeric Decoder is applied to a memory system (not shown) where the information is stored until utilized to control the machine tool. The Tape Reader Drive and Synchronous Start Network, which is illustrated in more detail in FIG. 5, serves as a means for energizing and de-energizing the system. It utilizes a push-button Start-Stop Switch in series with the NO contact of a reset memory relay RMR and the coil of a cycle start relay CSR. This series network extends between a pair of power lines 118 and a line 119. Across the Start-Stop switch is the NO contact CSR associated with the coil CSR. Also across the lines 118 and 119 is a Reset push-button in series with a reset relay coil RR. Another parallel branch across the lines 118 and 119 is the series combination of the NO contact of the reset relay RR and the coil of a reset memory relay RMR. In parallel with the NO contact RR is a series combination of an NO contact of the reset memory relay RMR and an NO contact of a check memory relay (CMR). In FIG. 5, the check memory relay CMR is designated PCMR since it is checking parity. Also across the lines 118 and 119 is the series combination of an NC contact of the RMR relay and a Parity Error Indicator which may be in the form of a light or a buzzer.

Before further explaining the theory of operation of the Synchronous Start network of FIG. 5, the auxiliary parity check circuit of FIG. 4 will be further described. In FIG. 4, the NO contact 117 is shown within the block indicating the Parity Check Circuit. One member of the contact 117 is tied to ground and the other contact member is connected to the anodes of the diode 120 and a diode 121. The cathode of the diode 120 joins the Tape Reader Drive and Synchronous Start circuit and the Numeric Decoder. Joining the diode 121 is one side of an off-bias resistive component 122 also joining a third NO contact of the RMR relays and extending to a positive potential V. The cathode of the diode 121 engages the gate element of a silicon-controlled rectifier (SCR) 123. Extending between the cathode and the gate element of the SCR 123 is a parallel RC network including a resistor 124 and a capacitor 125. The cathode of the SCR 123 extends to ground through a Zener diode 126. Extending between the anode of the SCR 123 and the contact RMR is a resistive component 127. Extending between the anode and the cathode of the SCR 123 is the series combination of a resistive component 128 and the coil of the check memory relay (CMR) herein designated PCMR. Extending across the PCMR relay coil is a diode 129 with the cathode joining the junction of the resistor 128 and the PCMR coil.

The theoretical operation of the energizing-deenergizing network (Tape Reader Drive and Synchronous Start network) of FIG. 5 and the auxiliary parity check auxiliary circuit as shown in the block diagram of FIG. 4 is believed to be as hereinafter stated. In initially energizing the system for operation, the Reset push-button in FIG. 5 is closed such that there is a continuous circuit between the lines 118 and 119 through the coil of the relay RR. As such, the coil RR is excited and the NO contact RR is closed. With the closing of the NO RR contact, there is a continuous path between the lines 118 and 119 of FIG. 5 through the RMR coil thus closing the NO and opening the NC contacts of the RMR relay. Again viewing FIG. 4, the closing of the NO RMR contacts provides a closed path through the PCMR relay coil across the potential +V. Exciting the PCMR coil results in closing the NO PCMR contacts (FIG. 5). Thus, when the Reset push-button is released, the system is in position for closing the Start-Stop push-button and energizing the coil of the CSR relay. Energizing the coil of the CSR relay closes the NO CSR contacts and the system is energized for operation. As the tape advances through the tape reader and the parity check indicates an odd number of One bits, the contact 117 closes for each character and opens when the tape advances. During tape advance, a grounding pulse is received from the Tape Reader Drive and Synchronous Start circuit to prevent firing of the SCR 123 during this period. When the contact 117 is closed, it places the gate of the SCR 123 substantially at ground potential and the SCR 123 provides an open circuit in parallel with the PCMR relay coil. As long as the parity check is proper, the PCMR relay coil is excited and the system continues operation. If the parity is not proper, such as when the Line 5 of tape segment 9 is read, the contact 117 assumes an open condition placing the gate of the SCR 123 above ground potential thereby firing the SCR and providing a short circuit around the PCMR relay coil.

Shorting the PCMR relay coil permits the PCMR contacts (FIG. 5) to assume their normal open position. Thus, the RMR coil is disconnected between the source lines 118 and 119 and the RMR contacts assume their normal position. The normally-closed RMR contacts in series with the Parity Error Indicator close thereby exciting the Parity Error Indicator. At the same time, the RMR contacts in series with the Start-Stop switch open to thereby de-energize the CSR coil and the system. Thus, the system is de-energized and the Parity Error Indicator indicates the reason for shutdown. The RMR contact in series with the PCMR coil and the SCR 123 also open and place the auxiliary circuit of FIG. 4 in an inactive state.

In FIG. 4, the diode 129 across the PCMR relay is incorporated to eliminate switch-off transients; the resistors 127 and 128 provide a voltage divider network for a potential across the SCR 123; the resistor 124 serves as a gate-cathode resistor to reduce leakage through the gate-cathode junction of the SCR 123; and the capacitor 125 is included to improve noise immunity. The use of the Zener diode 126 is intended to improve assurance against misfiring of the SCR 123. For example, the voltage drop across the Zener diode 126 reverse-biases the gate-cathode junction of the SCR 123 compensating for small positive voltages appearing across the diode 120 and the Tape Reader Drive and Synchronous Start network which may otherwise result in misfiring the SCR 123. The diode 121 is intended to guard against negative gate current.

The detector of the present invention provides a rapid operating network, which can be easily and economically manufactured through incorporation of the teachings of the present day printed circuit and miniature circuit technology. The rapidity with which the detector network of FIG. 2 can detect the presence of One bits will be obvious to those familiar with solid-state components. The circuit reacts at speeds found only in solid-state circuitry. Though the indication of an error is somewhat delayed due to the parameters of the relay 107, there are relays available capable of accommodating speeds in excess of the one-hundred lines per second. For example, printed circuit reed relays having one millisecond pick-up time have been found to be very successful. To take fuller advantage of the speed of solid-state components, the ExO element 21 can also be a solid-state network.

We claim:

1. A detector network for simultaneously receiving a plurality of electrical Zero and One bit signals according to a format having binary coded information sections and providing an output indication when the sum of the simultaneously received One bit signals of one of said sections deviates from a preselected standard of an odd or even number of One bits comprising, in combination:

supply potential terminal means for receiving an electrical supply source;

reading means for detecting the presence or absence of One bits within a select section of a binary coded information format, said reading means adapted to alternatively generate corresponding One bit indications and Zero indications according to the presence of respective coded One and Zero bits of said section, and including a plurality of C-type contacts, with the number of C-type contacts corresponding to the number of recorded bits to be simultaneously read, each C-type contact having a normally-open contact and a normally-closed contact, each C-type contact extending to one side of the terminal means and switching between the open and closed position according to the associated recorded bit signal, and in which a first group of Exclusive-Or logic elements including input terminals and output terminals, said input terminals arranged to receive the Zero bit and One bit indications from the reading means, each element of said first group being capable of receiving at least two One bit indications and generating an output indication when only a single One bit indication is presented to the respective input terminals, the elements including a plurality of solid-state current gates, each gate having a control element, a first and a second electrode extending across the supply potential terminal means, the bias potential of said control element controlling the conductive and non-conductive state between said first and second electrodes according to the presence of a single One bit signal;

each Exclusive-Or logic element of the first group includes a first unidirectional path between said control element and the other side of the terminal means, a second unidirectional path parallel to said first path, a third unidirectional path extending between the other side of the terminal means and the normally-closed contact of the first C-type contact, a fourth unidirectional path joining the normally-open contact of a second C-type contact and extending parallel to the third path, a fifth unidirectional path joining the normally-open contact of the first C-type contact and extending to the other side of the terminal means, and a sixth unidirectional path joining the normally-closed contact of the second C-type contact and extending parallel to the fifth path; whereby when the contacts of one C-type contact switch from their respective normal position, the control element is biased thereby placing the associated current gate in a conductive state and when neither or both contacts of the C-type contact switch from their normal position, the control element remains unbiased and the current gate in a non-conductive state;

a second group of Exclusive-Or logic elements in cascaded relationship to said first group and arranged to receive at least two output indications from the output terminals of the first group of Exclusive-Or elements, each of said second group elements respectively adapted to generate a responsive output indication only when a single One bit signal is received from the associated elements of the first group; and responding means in cascaded relationship to said second group and arranged to receive the generated output indications from the second group elements, each element of the responding means alternatively assuming one conductive state when the number of output indications of the second group elements is odd and another conductive state when the number of output indications of the second group elements is even.

2. The detector network of claim 1 in which each of the solid-state current gates include a transistor with the collector-emitter extending across the supply potential terminal means, and a base element the potential of which controls the conductive state between the collector and emitter, a first diode extending between the base and the other side of the supply potential terminal means, a second diode extending between the base and parallel to the first diode, a third diode joining the first diode and extending to the normally-closed contact of one of said C-type contacts, a fourth diode joining the first diode and extending to the normally-open contact of another of said C-type contacts, a fifth diode joining the second diode and extending to the normally-open contact of the first-mentioned C-type contact, and a sixth diode joining the second diode and extending to the normally-closed contact of the second-mentioned C-type contact.

3. A detector network simultaneously receiving a plurality of electrical Zero and One Bit signals according to a format having binary coded information sections and providing an output indication when the sum of the simultaneously received One bit signals of one of said sections deviates from a preselected standard of an odd or even number of One bits comprising, in combination:

supply potential terminal means for receiving an electrical supply source;

reading means for detecting the presence or absence of One bits within a select section of a binary coded information format, said reading means adapted to alternatively generate corresponding One bit indications and Zero indications according to the presence of respective coded One and Zero bits of said section;

a first group of Exclusive-Or logic elements including input terminals and output terminals, said input terminals arranged to receive the Zero bit and One bit indications from the reading means, each element of said first group being capable of receiving at least two One bit indications and generating an output indication when only a single One bit indication is presented to the respective input terminals, said elements including a plurality of solid-state current gates, each gate having a control element, a first and a second electrode extending across the supply potential terminal means, the bias potential of said control element controlling the conductive and nonconductive state between said first and second electrodes according to the presence of a single One bit signal;

a second group of Exclusive-Or logic elements in cascaded relationship to said first group and arranged to receive at least two output indications from the output terminals of the first group of Exclusive-Or elements, each of said second group elements respectively adapted to generate a responsive output indication only when a single One bit signal is received from the associated elements of the first group;

said elements of said second group including a full-wave bridge rectifier with a pair of input terminals and a pair of output terminals, one of said input terminals joining the circuit path of the first and second electrodes of a current gate of the first group, whereby the first input terminal is at a first potential when the associated first group current gate is in a conductive state and at a second potential when the associated first group current gate is in a non-conductive state, the other of said input terminals joining the circuit path of the first and second electrodes of another current gate of the first group, whereby the other of said input terminals is at substantially the the first potential when the associated other first group gate is in a conductive state and at the second potential when the associated other first group current gate is in a non-conductive state, such that a potential difference exists between the output terminals when a potential difference exists between the input terminals; and responding means in cascaded relationship to said second group and arranged to receive the generated output indications from the second group elements, each element of the responding means alternatively assuming one conductive state when the number of output indications of the second group elements is odd and another conductive state when the number of output indications of the second group elements is even;

said responding means including an electromagnetic relay having a coil with two windings and a pair of contacts assuming either a normally-open or normally-closed contact relationship, said contact relationship being responsive to the net field of the windings of said coils, each winding extending between the output terminals of an associated full-wave bridge rectifier of the second group so as to carry current and generate a field when a potential difference exists between the output terminals of the respective second group elements.

4. A detector network for simultaneously receiving a plurality of electrical Zero and One bit signals according to a format having binary coded information sections and providing an output indication when the sum of the simultaneously received One bit signals of one of said sections deviates from a preselected standard of an odd or even number of One bits comprising, in combination:

supply potential terminal means for receiving an electrical supply source;

reading means for detecting the presence or absence of One bits within a select section of a binary coded information format, said reading means adapted to alternatively generate corresponding One bit indications and Zero indications according to the presence of respective coded One and Zero bits of said section;

a first group of Exclusive-Or logic elements including input terminals and output terminals, said input terminals arranged to receive the Zero bit and One bit indications from the reading means, each element of said first group being capable of receiving at least two One bit indications and generating an output indication when only a single One bit indication is presented to the respective input terminals, said elements of the first group including more than two solid-state current gates, each gate having a control element, a first and second electrode extending across the supply potential terminal means, means for generating a bias potential between said control element and one of said electrodes, said bias potential controlling the conductive and nonconductive states between said first and second electrodes, a first unidirectional path extending through said bias means and across the supply potential terminal means, a second unidirectional path extending through said bias means and parallel to said first unidirectional path, said first and second paths each receiving the information of two recorded bits, a third path extending across said supply potential terminal means and parallel to said first path and a fourth path extending across said supply potential terminal means and parallel to said second path, said third and fourth paths assuming alternative electrically-open or unidirectionally-closed relationship with said supply potential terminal means according to the level of a first single recorded bit, a fifth path extending across said supply potential terminal means and parallel to said first path extending across said supply potential terminal means and parallel to said second path, said fifth and sixth paths assuming alternatively electrically-open or unidirectionally-closed relationship according to the level of a second single recorded bit, the electrical relationship of said third and sixth paths being opposite to each other and the electrical relationship of said fourth and fifth paths being opposite to each other, whereby when the first and second recorded bits are at equal levels the first and second unidirectional paths are bypassed and when the first and second bits are of opposing levels, a bias potential is generated;

a second group of Exclusive-Or logic elements in cascaded relationship to said first group and arranged to receive at least two output indications from the output terminals of the first group of Exclusive-Or elements, said second group elements adapted to generate a responsive output indication only when a single One bit signal is received from the associated elements of the first group and including two full-wave bridge rectifiers, each having a pair of input terminals and a pair of output terminals, one input terminal of each bridge individually joining the circuit path of the first and second electrodes of an element of the first group, whereby the first terminal is at a first potential when the associated first group element is in a conductive state and at a second potential when the associated first group element is in a non-conductive state, and the second terminal of said input terminals of each second group element individually join the circuit path of the first and second electrode of another element of the first group, whereby the second terminal is at substantially the first potential when the associated first group element is in a conductive state and at the second potential when the associated first group element is in a non-conductive state such that a potential difference exists between the output terminals of each second group element when a potential difference exists between its associated input terminals; and responding means in cascaded relationship to said second group and arranged to receive the generated output indications from the second group elements, each element of the responding means alternatively assuming one conductive state when the number of output indications of the second group elements is odd and another conductive state when the number of output indications of the second group elements is even, including an electromagnetic relay having a coil with two windings, and a contact assuming either a normally-open or normally-closed condition, each coil individually extending across the output terminals of a respective second group element and in opposing field relationship such that when approximately normal current flows through both coils the net generated field is substantially zero and the contact retains the normal position and when only one coil carries substantially normal current, the contacts assume an opposite contact relationship.

5. A detector network for simultaneously receiving a plurality of electrical Zero and One bit signals according to a format having binary coded information sections and providing an output indication when the sum of the simultaneously received One bit signals of one of said sections deviates from a preselected standard of an odd or even number of One bits comprising, in combination:

supply potential terminal means for receiving an electrical supply source;

reading means for detecting the presence or absence of One bits within a select section of a binary coded information format, said reading means adapted to alternatively generate corresponding One bit indications and Zero indications according to the presence of respective coded One and Zero bits of said section;

a first group of Exclusive-Or logic elements including input terminals and output terminals, said input terminals arranged to receive the zero bit and One bit indications from the reading means, each element of said first group being capable of receiving at least two One bit indications and generating an output indication when only a single One bit indication is presented to the respective input terminals, each of the elements of the first group including solid-state control gates extending across said supply potential terminal means and having a conductive state responsive to the presence of One bits received;

a second group of Exclusive-Or logic elements in cascaded relationship to said first group and arranged to receive at least two output indications from the output terminals of the first group of Exclusive-Or elements, each of said second group elements respectively adapted to generate a responsive output indication only when a single One bit signal is received from the associated elements of the first group;

responding means in cascaded relationship to said second group and arranged to receive the generated output indications from the second group elements, each element of the responding means alternatively assuming one conductive state when the number of output indications of the second group elements is odd and another conductive state when the number of output indications of the second group elements is even;

an energizing and de-energizing circuit including an electromagnetic reset relay (RR) having a coil and a pair of normally-open contacts; a reset switch connected in series with said RR relay coil across terminal means of a power potential source; and electromagnetic reset memory relay (RMR) having a coil, two sets of normally-open contacts and one set of normally-closed contacts, said coil of the RMR connected in series with the normally-open contacts of the RR across the power potential source; a start-stop switch connected in series with one set of the normally-open contacts of the RMR relay across the power potential source, an electromagnetic checking memory relay (CMR) having a coil and a pair of normally-open contacts, the CMR contacts connected in series with the other set of normally-open contacts of the RMR relay and in parallel with the contacts of the RR relay; electrical indicator means connected in series with the normally-closed contacts of the RMR relay and across the power potential source; and an auxiliary network responsive to the bistable means and including a silicon-controlled rectifier having an anode, cathode and gate element, said anode-cathode extending across the bias potential terminal means and across the coil of the CMR relay, the gate element joining the responding means and gate bias means having a bias potential sufficient to place the rectifier in a conductive state when applied, which responding means when in a conductive state places the anode at one potential level and when in the non-conductive state places the anode at substantially the bias potential level, said rectifier when in a conductive state provides a low impedance path around the CMR coil and when in a non-conductive state provides a substantially-open circuit around the CMR coil.

References Cited

UNITED STATES PATENTS

| | | | |
|---|---|---|---|
| 3,001,711 | 9/1961 | Frohman | 235—176 |
| 3,141,962 | 7/1964 | Sakalay | 340—146.1 X |
| 3,254,232 | 5/1966 | Candy | 307—216 |

FOREIGN PATENTS

| | | |
|---|---|---|
| 151,876 | 12/1961 | U.S.S.R. |

OTHER REFERENCES

Kuck and Klepp, Exclusive-Or Circuit, IBM Technical Disclosure Bulletin, vol. 8, No. 4, September 1965 (Copy in Group 250).

MALCOLM A. MORRISON, Primary Examiner

CHARLES E. ATKINSON, Assistant Examiner

U.S. Cl. X.R.

235—153; 307—216